United States Patent
Hwang et al.

(10) Patent No.: US 8,015,894 B2
(45) Date of Patent: Sep. 13, 2011

(54) INTELLIGENT TRANSMISSION ELEMENT

(75) Inventors: Yi-Chyun Hwang, Taichung (TW);
Chun-Lin Yu, Taichung (TW);
Chung-Hsueh Lin, Taichung (TW)

(73) Assignee: HIWIN Technologies Corp., Taichung (TW)

( * ) Notice: Subject to any disclaimer, the term of this patent is extended or adjusted under 35 U.S.C. 154(b) by 342 days.

(21) Appl. No.: 12/391,397

(22) Filed: Feb. 24, 2009

(65) Prior Publication Data
US 2010/0212443 A1  Aug. 26, 2010

(51) Int. Cl.
*F16H 25/22*  (2006.01)
(52) U.S. Cl. .................. 74/424.88; 384/520; 384/624
(58) Field of Classification Search .. 74/424.81–424.91;
384/51, 520, 624
See application file for complete search history.

(56) References Cited

U.S. PATENT DOCUMENTS

| | | | |
|---|---|---|---|
| 3,369,521 A * | 2/1968 | Meeder, Jr | 116/203 |
| 3,590,957 A * | 7/1971 | Campbell et al. | 184/99 |
| 4,822,183 A * | 4/1989 | Lederman | 384/607 |
| 6,095,009 A * | 8/2000 | Takagi | 74/424.88 |
| 6,513,978 B2 * | 2/2003 | Shirai et al. | 384/45 |
| 6,561,054 B1 * | 5/2003 | Chiu et al. | 74/424.88 |
| 6,966,698 B2 * | 11/2005 | Wu et al. | 384/49 |
| 7,222,553 B2 * | 5/2007 | Okita et al. | 74/424.88 |
| 2007/0251329 A1 * | 11/2007 | Balasu et al. | 73/810 |
| 2009/0071278 A1 * | 3/2009 | Chiu et al. | 74/424.82 |

* cited by examiner

*Primary Examiner* — Richard W Ridley
*Assistant Examiner* — Terence Boes
(74) *Attorney, Agent, or Firm* — Chun-Ming Shih

(57) ABSTRACT

An intelligent transmission element includes a first element formed in a strip shape and disposed with a slot therein; a second element disposed with a containing space for placing the first element, wherein the inner side of the containing space is disposed with a tank corresponding to the plurality of slots, the tank and the plurality of slots forms a loading path for disposing a plurality of rolling elements and a silencing element. The silencing element is placed between the plurality of rolling elements and contains a dye container for a dye. When the silencing element is damaged due to an external force, the dye inside the dye container of the silencing element would color the transmission element to let the user notice that the silencing element is damaged.

5 Claims, 4 Drawing Sheets

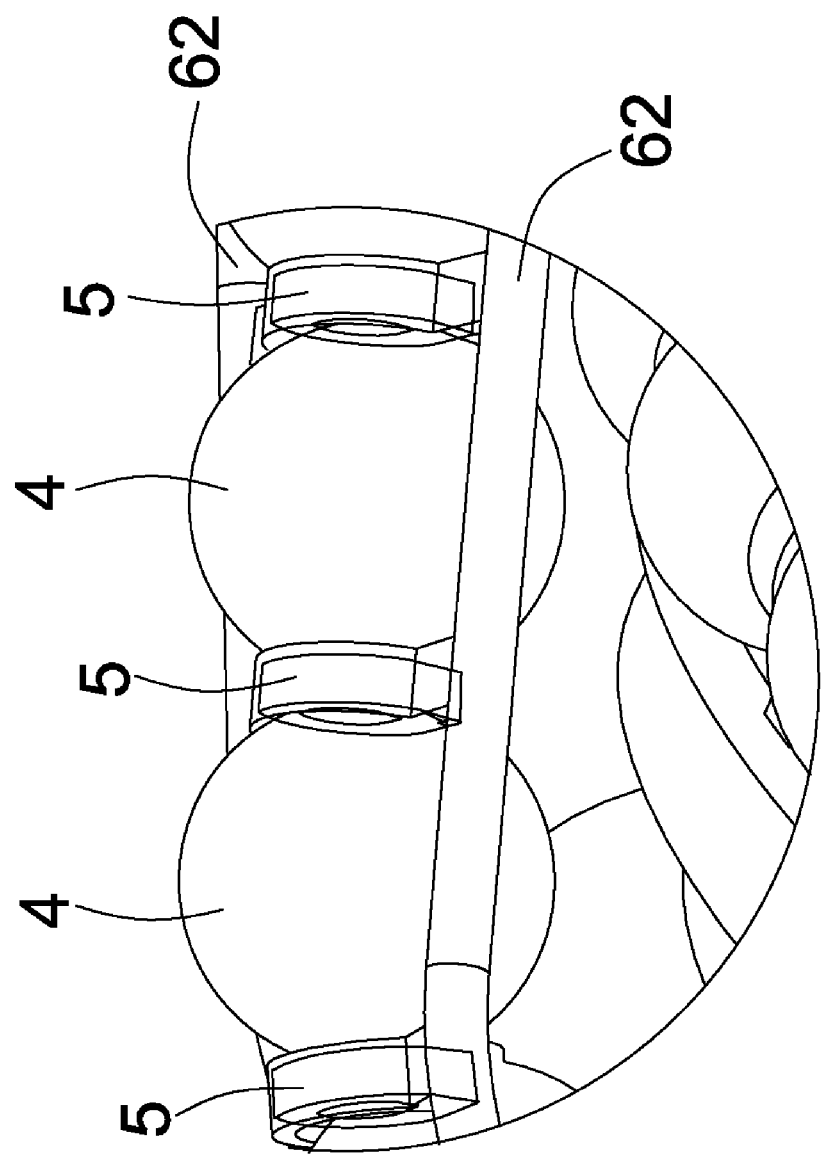

INTELLIGENT TRANSMISSION ELEMENT

BACKGROUND OF THE INVENTION

1. Field of the Invention

The present invention relates to an intelligent transmission element, and more particularly, to a linear guide rail, a ball screw, a bearing, a linear bearing having the intelligent transmission element.

2. Description of the Prior Art

U.S. Pat. No. 6,513,978, No. 7,222,553 and No. 6,095,009 disclose various kinds of spacers (silencing elements) having different shapes with corresponding rolling elements and their operating conditions, etc. In these prior art, spacers are used for separating rolling elements to reduce noises and frictions due to rolling elements rubbing against each other; therefore, the spacer would inevitably run into the rolling element and get damaged, later the spacer may be broken and impede the operation of the rolling element, in the end the lifetime of the transmission element could be severely affected.

SUMMARY OF THE INVENTION

The primary object of the present invention is to provide a silencing element for a transmission element, wherein the silencing element is disposed with a dye container covering a dye therein, when the silencing element is damaged, the dye container would crack and color the transmission element with the dye to let the user notice that the silencing element is damaged.

To achieve the above objects, the present invention provides a silencing element for a transmission element, the silencing element comprises a covering element and a dye container, the covering element completely covers the dye container, and the dye container contains a dye.

To achieve the above objects, the present invention discloses an intelligent transmission element, which comprises:

a first element formed in a strip shape and disposed with a plurality of slots;

a second element disposed with a containing space for placing the first element, wherein the containing space is disposed with a tank corresponding to the slot, the tank and the plurality of slots form a loading path;

a re-circulating element disposed on the second element, the re-circulating element coupling with the loading path to form a circulating path;

a plurality of rolling elements disposed in the circulating path, the plurality of rolling elements acting as a transmission medium between the first element and the second element; and a plurality of silencing elements disposed between the rolling elements, each silencing element comprising a covering element and a dye container, the covering element completely covering the dye container which contains a dye. Therefore, when the silencing element is damaged, the dye container would crack and let the dye color the first element or the second element.

To clearly illustrate the present invention, the object of present invention is achieved as follows:

The present invention uses the dye container inside the silencing element to find out whether the silencing element is damaged and to stop the operation of the transmission element if the silencing element is broken. Therefore the present invention can actively report the abnormality and minimize the damage to the transmission element to extend the lifetime of the transmission element.

BRIEF DESCRIPTION OF THE DRAWINGS

The drawings disclose an illustrative embodiment of the present invention, which serves to exemplify the various advantages and objects hereof, and are as follows:

FIG. 4 illustrates an expanded view from the X region of FIG. 3.

DETAILED DESCRIPTION OF THE PREFERRED EMBODIMENT

Figure 1:
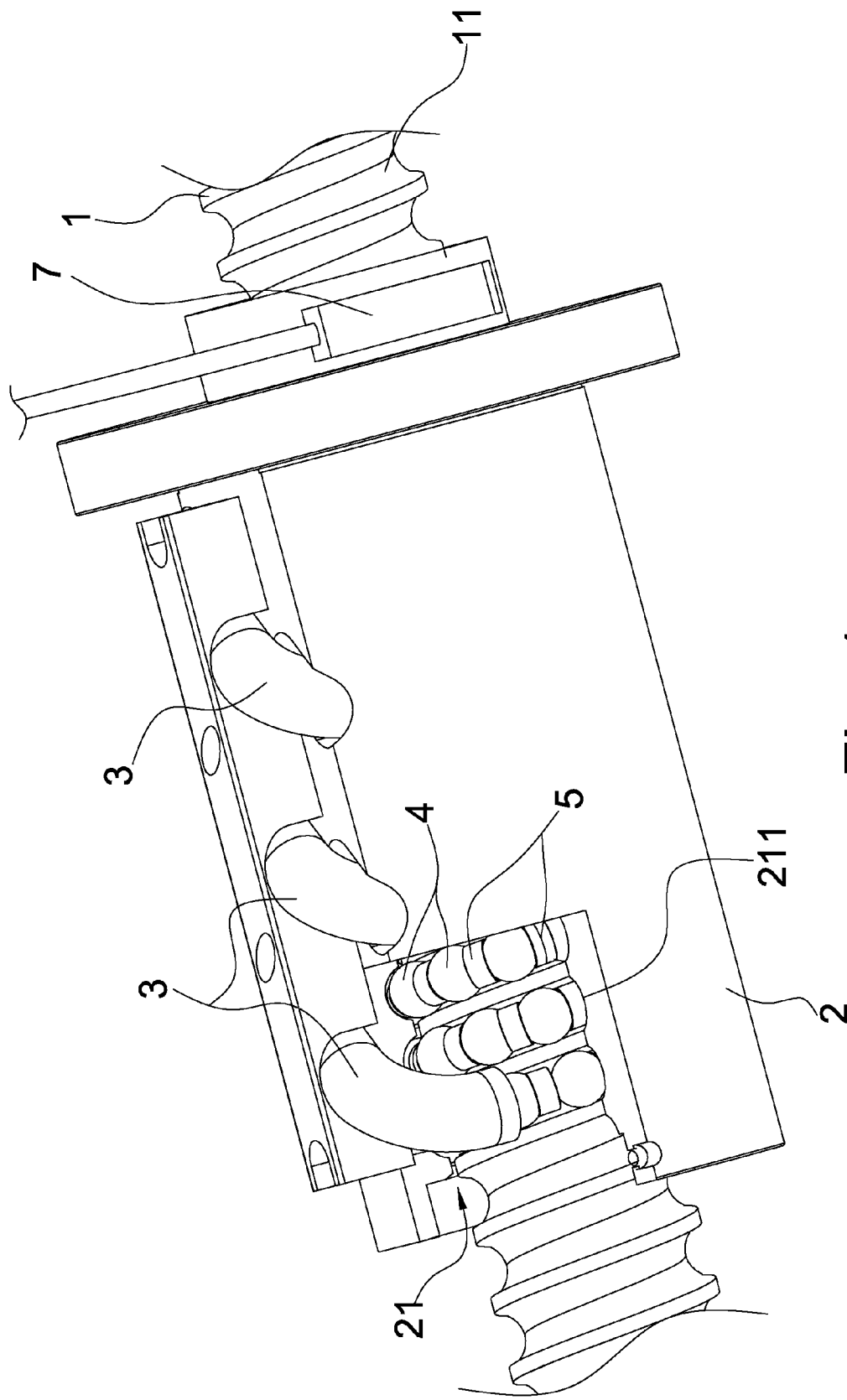
FIG. 1 illustrates a perspective view of an intelligent transmission element in the present invention.
Figure 2:
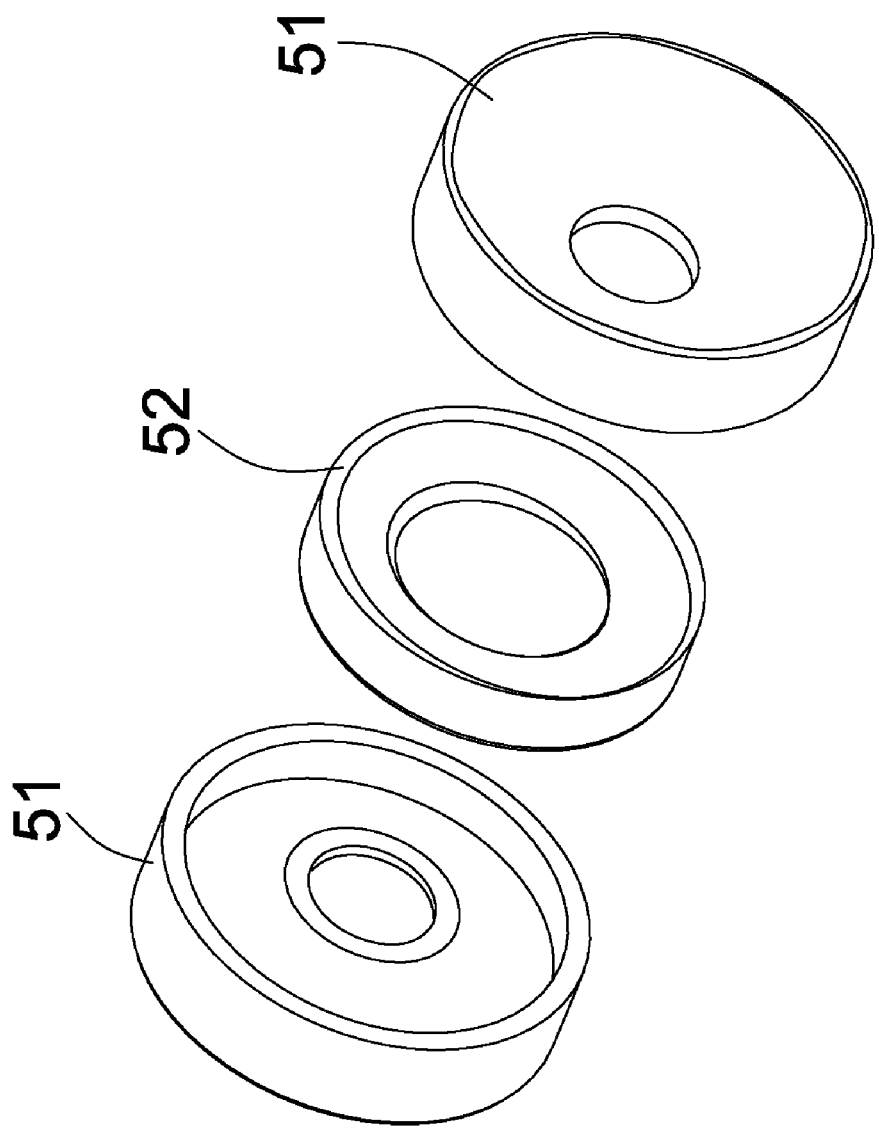
FIG. 2 illustrates an exploded view of a silencing element and a dye container in the present invention.

Please refer to FIG. 1 and FIG. 2 for an intelligent transmission element in the present invention, the transmission element comprises:

a first element 1 formed in a strip shape and disposed with a plurality of slots 11;

a second element 2 disposed with a containing space 21 for placing the first element, wherein the containing space 21 is disposed with a tank 211 corresponding to the slot 11, the tank 211 and the plurality of slots 11 form a loading path;

a re-circulating element 3 disposed on the second element 2, the re-circulating element is disposed with a re-circulating path (not shown in figure) to couple with the loading path to form a circulating path;

a plurality of rolling elements 4 disposed in the circulating path, the plurality of rolling elements 4 acting as a transmission medium between the first element 1 and the second element 2; and a plurality of silencing elements 5 disposed between the rolling elements 4, each silencing element 5 comprising a covering element 51 and a dye container 52, the covering element 51 completely covering the dye container 52, which contains a dye. Therefore, when the silencing element 5 is damaged, the dye container 52 would crack and let the dye color the first element 1 or the second element 2. Then the user can visually find out the silencing element 5 is broken and stop the operation of the transmission element. Furthermore, a sensing device 7 (which is sensitive to color) can be disposed on the transmission element, the sensing device 7 can issue a warning signal (a buzzer or a warning light) to inform the user when it senses a color change on the first element 1 or the second element 2 to let the user stop the operation of the transmission element immediately.

Figure 3:
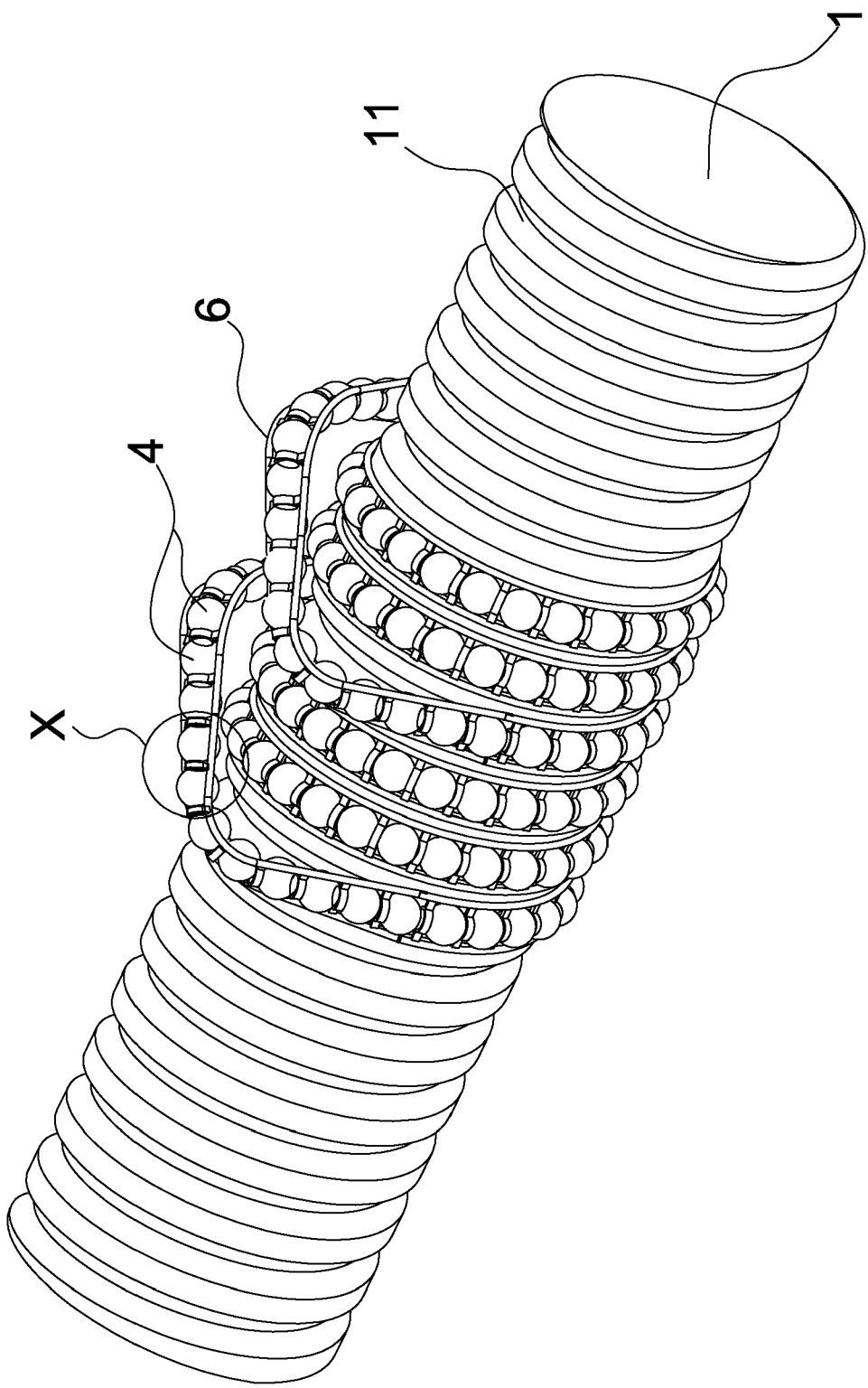
FIG. 3 illustrates another silencing element in cooperation with a first element and a rolling element.

In accordance with another embodiment of the present invention, please refer to FIG. 3 and FIG. 4, the silencing element 5 has its two sides each disposed with a connecting portion 62 for connecting each silencing element for forming the silencing elements 5 into a silencing chain 6; in this way the operation of assembling the plurality of the silencing elements into the loading path is simplified (because it is not necessary to assembly the silencing elements one by one into the loading path); besides, the connecting portion 62 can contain the dye container 52 therein. When the connecting portion is broken, the dye contained in the dye container 52 would also color the first element 1 or the second element 2 to warn in advance to minimize the damage to the transmission element.

Accordingly, the present invention uses the dye container inside the silencing element to find out whether the silencing element is damaged and to stop the operation of the transmission element immediately if the silencing element is broken. Therefore the present invention can actively report the abnormality and minimize the damage to the transmission element to extend the lifetime of the transmission element.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A ball bearing spacing element for a transmission element, the ball bearing spacing element comprising a covering element and a dye container, wherein the covering element completely covers the dye container, and the entire dye container completely surrounds a dye.

2. The ball bearing spacing element for a transmission element as claimed in claim 1, wherein the ball bearing spacing element has two sides each disposed with a connecting portion for connecting each ball bearing spacing element for forming the ball bearing spacing elements into a silencing chain, and the connecting portion contains the dye container therein.

3. The ball bearing spacing element for a transmission element as claimed in claim 1, wherein the transmission element is disposed with a sensing device thereon, and the sensing device is provided for sensing the dye, if the sensing device senses the dye, a warning signal is issued to inform the user.

4. The ball bearing spacing element for a transmission element as claimed in claim 3, wherein the warning signal is a buzzer or a warning light.

5. An intelligent transmission element, comprising:
a first element formed in a strip shape and disposed with a plurality of slots; and
a second element disposed with a containing space for placing the first element, wherein the containing space is disposed with a nut inner thread corresponding to the slot, and the nut inner thread and the plurality of slots form a loading path;
a re-circulating element disposed on the second element, the re-circulating element coupling with the loading path to form a circulating path;
a plurality of rolling elements disposed in the circulating path, the plurality of rolling elements acting as a transmission medium between the first element and the second element; and
a plurality of ball bearing spacing elements disposed between the rolling elements, each ball bearing spacing element comprising a covering element and a dye container, the covering element completely covering the dye container, the entire dye container completely surrounding a dye.

* * * * *